United States Patent Office 3,658,958
Patented Apr. 25, 1972

3,658,958
METHOD OF INHIBITING GASTRIC ACID SECRETION WITH 2 - (2,6 - DICHLOROPHENYLIMINO) PYRROLIDINES
Timothy Yu-Wen Jen and Bernard Loev, Broomall, Pa., assignors to Smith Kline & French Laboratories, Philadelphia, Pa.
No Drawing. Filed Oct. 21, 1969, Ser. No. 868,231
Int. Cl. A61k 27/00
U.S. Cl. 424—274        2 Claims

ABSTRACT OF THE DISCLOSURE

2 - (2,6 - disubstituted-phenylimino)pyrrolidines and piperidines and compositions and methods for producing inhibition of gastric acid secretion substantially without hypotensive activity with 2 - (2,6 - dichlorophenylimino)pyrrolidine and N-lower alkanoyl derivatives thereof.

---

This invention relates to 2-(2,6-disubstituted-phenylimino)pyrrolidines and piperidines having pharmacodynamic activity and to compositions and methods for producing inhibition of gastric acid secretion substantially without hypotensive activity.

The compounds of this invention are represented by the following formula:

FORMULA I

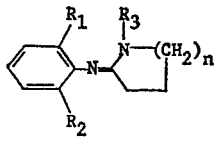

in which:

$R_1$ and $R_2$ are the same and are halo or lower alkyl;
$R_3$ is hydrogen or lower alkanoyl; and
$n$ is 1 or, when $R_1$ and $R_2$ are lower alkyl, 2 and pharmaceutically acceptable salts thereof.

Preferred compounds of this invention are represented by Formula I in which $R_1$ and $R_2$ are both chloro or are both methyl, $R_3$ is hydrogen or acetyl, preferably hydrogen and $n$ is 1.

The compounds of Formula I in which $n$ is 1 produce inhibition of gastric acid secretion by increasing the gastric pH or decreasing the volume of gastric juice, as demonstrated by administration to rats at doses of about 2 to about 50 mg./kg. orally. The compounds of Formula I in which $R_1$ and $R_2$ are lower alkyl and $n$ is 1 or 2 have hypotensive activity as demonstrated by administration to neurogenic hypertensive dogs at doses of about 2.5 to about 20 mg./kg. orally.

The compositions of this invention for producing inhibition of gastric acid secretion substantially without hypotensive activity comprises, in dosage unit form, a pharmaceutical carrier and a compound of Formula I in which $R_1$ and $R_2$ are chloro, $R_3$ is hydrogen or lower alkanoyl, preferably acetyl, and $n$ is 1 and pharmaceutically acceptable salts thereof. These active ingredients of the compositions are represented by the following formula:

FORMULA II

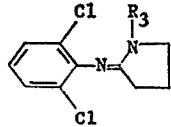

in which $R_3$ is hydrogen or lower alkanoyl, preferably acetyl and pharmaceutically acceptable salts thereof.

A preferred composition of this invention comprises, in dosage unit form, a pharmaceutical carrier and 2-(2,6-dichlorophenylimino)pyrrolidine.

The compositions of this invention contain a compound of Formula II in an amount of from about 10 mg. to about 500 mg., preferably from about 25 mg. to about 300 mg.

The pharmaceutical carrier may be, for example, either a solid or a liquid. Exemplary of solid carriers are lactose, magnesium stearate, terra alba, sucrose, talc, stearic acid, gelatin, agar, pectin or acacia. Exemplary of liquid carriers are peanut oil, olive oil, sesame oil and water. Similarly, a carrier or diluent may include a time delay material such as glyceryl monostearate or glyceryl distearate alone or with a wax.

A wide variety of pharmaceutical forms can be employed. Thus, if a solid carrier is used, the preparation can be tableted, placed in a hard gelatin capsule or in the form of a troche or lozenge. The amount of solid carrier will vary widely but preferably will be from about 25 mg. to about 1 gm. If a liquid carrier is used, the preparation may be in the form of a soft gelatin capsule or a liquid suspension.

The method in accordance with this invention comprises administering internally to an animal organism a compound of Formula I in an amount sufficient to produce inhibition of gastric acid secretion substantially without hypotensive activity. The active ingredient will be administered preferably in a pharmaceutical composition in a dosage unit form as described above. The route of administration will be orally or parenterally, the oral route being preferred. The active ingredient will be administered in a total daily dosage of from about 10 mg. to about 1500 mg., preferably from about 25 to about 900 mg. Advantageously, dosage units will be administered about one to three times daily.

The 2-(2,6-disubstituted-phenylimino)pyrrolidines and piperidines of this invention, including the 2-(2,6-dichlorophenylimino)pyrrolidines which are the active ingredients of the compositions of this invention and are used in the methods of this invention, are prepared by the following procedure:

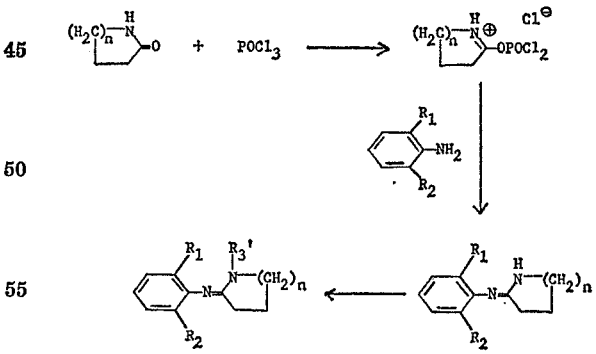

The terms $R_1$, $R_2$ and $n$ are as defined above and $R_3'$ is lower alkanoyl.

The nontoxic, pharmaceutically acceptable, acid addition salts of the compounds of Formulas I and II are formed with organic and inorganic acids by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicyclic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric and nitric acids. Of course, these salts may also be prepared by the classical method of double decomposition of appropriate salts which is well-known to the art.

The term "lower alkyl" where used herein denotes groups having 1–4 carbon atoms, preferably methyl; "lower alkanoyl" denotes groups having 2–4 carbon atoms, preferably acetyl and "halo" denotes chloro, bromo or fluoro.

The following examples are illustrative of the invention.

EXAMPLE 1

Phosphorus oxychloride (15.5 g.) in 10 ml. of anhydrous benzene is added slowly to a stirring solution of 17.0 g. of 2-pyrrolidone in 25 ml. of benzene with cooling. After five hours, 16.2 g. of 2,6-dichloroaniline in 20 ml. of benzene is added and the reaction mixture is refluxed gently overnight.

The benzene layer is decanted and the residue is washed with portions of benzene, then basified with 10% aqueous sodium hydroxide solution with cooling and extracted with benzene. The extract is washed with brine, dried over sodium sulfate and evaporated to dryness. The residue is distilled. The product collected at 150–160° C. (0.25 mm.) is recrystallized from benzene-hexane and then from cyclohexane to give 2-(2,6-dichlorophenylimino)pyrrolidine.

EXAMPLE 2

2-pyrrolidone (51 g.) in 75 ml. of benzene is treated with 46.5 g. phosphorus oxychloride in 30 ml. of benzene by the procedure described in Example 1. After five hours, 36.4 g. of 2,6-dimethylaniline is added and the reaction mixture is refluxed overnight, then worked up as in Example 1 to give 2-(2,6-dimethylphenylimino)pyrrolidine, distilled at 122–126° C. (0.1 mm.).

The above prepared base is treated with ethereal hydrogen chloride in ether. Concentrating in vacuo and recrystallizing the residue from absolute ethanol gives 2-(2,6-dimethylphenylimino)pyrrolidine hydrochloride.

EXAMPLE 3

A dry solution of 30 g. of 2-piperidone in benzene is treated with 23.5 g. of phosphorus oxychloride and then 18.6 g. of 2,6-dimethylaniline by the procedure described in Example 1. Working up as in Example 1 gives 2-(2,6-dimethylphenylimino)piperidine, distilled at 115–128° C. (0.1 mm.).

The above prepared 2-(2,6-dimethylphenylimino)piperidine in ether is treated with ethereal hydrogen chloride to give after concentrating in vacuo and recrystallizing the residue from isopropanol-ether 2-(2,6-dimethylphenylimino)piperidine hydrochloride.

EXAMPLE 4

Three grams of 2-(2,6-dichlorophenylimino)-pyrrolidine in 6 ml. of acetic anhydride is allowed to stand overnight at 25° C. The mixture is then poured into a water-ice mixture and stirred until the product solidifies. The solid material is filtered off and dried to give 1-acetyl-2-(2,6-dichlorophenylimino)pyrrolidine.

Similarly, using propionic anhydride in place of acetic anhydride, in the above procedure, the product is 2-(2,6-dichlorophenylimino)-1-propionylpyrrolidine.

Using butyric anhydride in the above procedure in place of acetic anhydride, the product is 1-butyryl-2-(2,6-dichlorophenylimino)pyrrolidine. Treating this product with ethereal hydrogen bromide and then concentrating in vacuo gives 1-butyryl-2-(2,6-dichlorophenylimino)pyrrolidine hydrobromide.

EXAMPLE 5

2-(2,6-dichlorophenylimino)pyrrolidine, prepared as in Example 1, in ethanol is treated with an equimolar amount of maleic acid in ethanol to give after concentrating in vacuo and recrystallizing the residue from ethanol the maleate salt of 2-(2,6-dichlorophenylimino)pyrrolidine.

EXAMPLE 6

Ingredients: Amounts, mg.
2 - (2,6 -dichlorophenylimino)pyrrolidine ---- 50
Lactose -------------------------------- 150

The ingredients are mixed, screened and filled into a hard gelatin capsule.

What is claimed is:

1. A method of producing inhibition of gastric acid secretion substantially without hypotensive activity which comprises administering to an animal organism in an amount sufficient to produce said activity a compound of the formula:

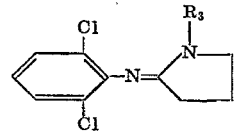

in which $R_3$ is hydrogen or lower alkanoyl having 2 to 4 carbon atoms, or pharmaceutically acceptable salts thereof.

2. A method according to claim 1 in which $R_3$ is hydrogen.

References Cited

UNITED STATES PATENTS 3,563,994  2/1971  Wollweber et al. _____ 424—274

OTHER REFERENCES

Deroent Farmdoc #34,432, NE 68, 055 73, published Oct. 25, 1968, pp. 19–24.

JEROME D. GOLDBERG, Primary Examiner

N. A. DREZIN, Assistant Examiner